United States Patent [19]
Chiba

[11] 3,973,581
[45] Aug. 10, 1976

[54] HYDRAULIC PRESSURE CONTROL VALVE

[75] Inventor: Keiichi Chiba, Tokyo, Japan

[73] Assignee: Nissan Motor Co., Ltd., Yokohama, Japan

[22] Filed: Aug. 2, 1974

[21] Appl. No.: 494,358

[30] Foreign Application Priority Data
Aug. 8, 1973 Japan............................. 48-88513

[52] U.S. Cl.............................. 137/116; 137/454.6
[51] Int. Cl.²....................................... G05D 16/10
[58] Field of Search................. 137/115, 116, 454.6

[56] References Cited
UNITED STATES PATENTS

| | | |
|---|---|---|
| 2,316,445 | 4/1943 | Marshall............................ 137/116 |
| 2,664,908 | 1/1954 | Strnad............................... 137/116 |
| 2,737,966 | 3/1956 | Lucien.............................. 137/116 |
| 2,779,346 | 1/1957 | Curlett.............................. 137/116 |
| 3,042,072 | 7/1962 | Humphrey et al.............. 137/454.6 |
| 3,294,104 | 12/1966 | Mercier............................. 137/116 |

*Primary Examiner*—Robert G. Nilson

[57] ABSTRACT

A combination of a control piston and pilot spool is slidable in a through passageway between an accumulator chamber and a spring chamber separated by a valve body in the valve housing. The combination slides in response to accumulator pressure causing shifting in fluid paths between inlet and outlet ports and drain to maintain the accumulator pressure constant.

13 Claims, 6 Drawing Figures

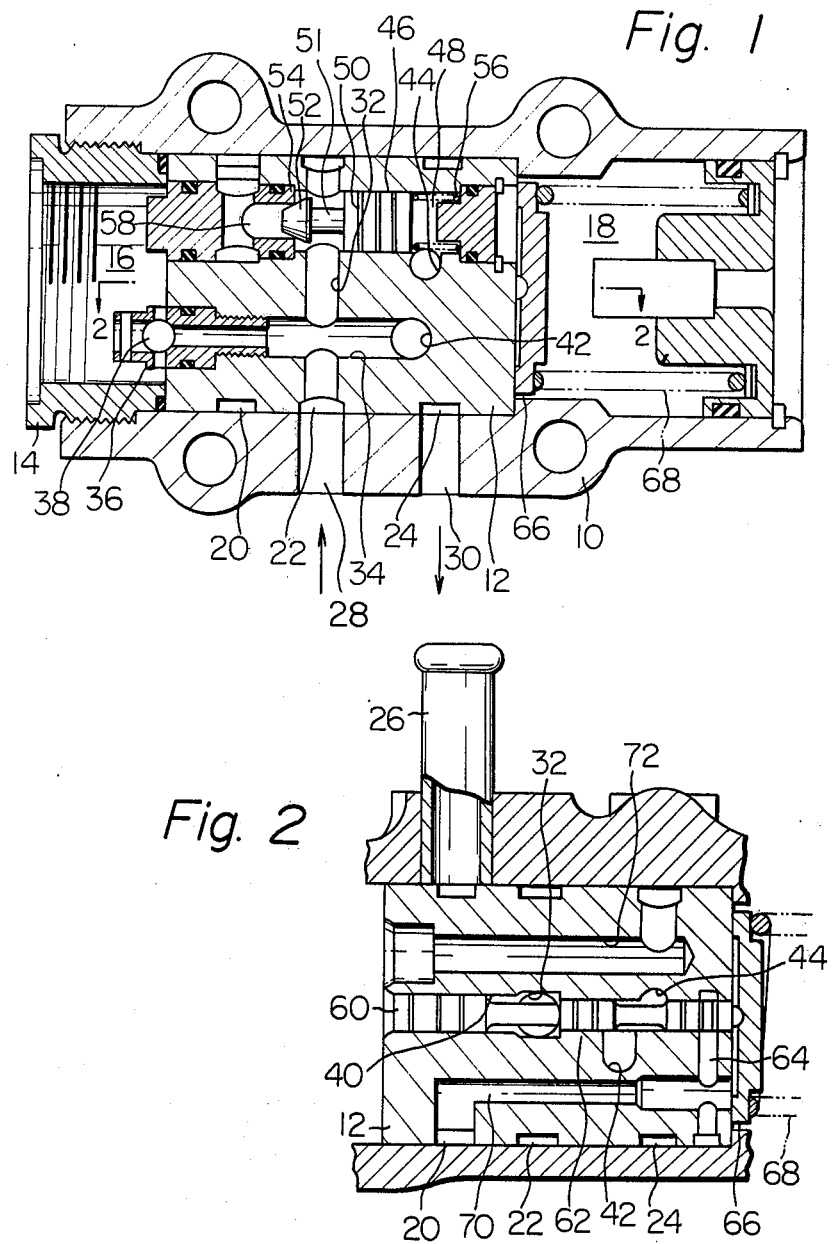

HYDRAULIC PRESSURE CONTROL VALVE

The present invention relates in general to a hydraulic valve, and particularly to a hydraulic control valve suitable for use in the hydraulic system of an automobile or the like. More particularly, this invention is concerned with a hydraulic pressure control valve incorporated in the hydraulic system of an automobile or the like and adaptable as a drain valve to control the pressures accumulated in an accumulator system by a hydraulic pump incorporated in the system.

Hydraulic pressure control valves of such type have been heretofore known, which are typically of such arrangement that when the hydraulic pressure in the accumulator decreases below a predetermined level, pressurized operating liquid produced by a hydraulic pump is directed to the accumulator, which is known as a state of "cut-in" of the hydraulic pressure control valve, and when the liquid pressure in the accumulator rises beyond the predetermined level, the whole quantity of the pump delivery or output is returned to a liquid reservoir tank, which is known as a state of "cut-out" of the control valve.

In respect of such function of the hydraulic pressure control valve incorporated in a hydraulic system for assuring the maintenance of the liquid pressure in an accumulator chamber of the hydraulic system, it is essential that such hydraulic pressure control valve should be precise in its shifting operation between the states of cut-in and cut-out thereof, and also that such shifting operation of the hydraulic pressure control valve should be made quickly in an instant. In consideration of such operating function of the hydraulic pressure control valve for such application, it would be advantageous to provide an improved valve of relatively simple construction which can shift between the positions of cut-in and cut-out quickly and with precision when so required to control the accumulator pressure. This invention is essentially intended to provide such a pressure control valve.

It is therefore a primary object of this invention to provide an improved hydraulic pressure control valve which includes a snap-action arrangement therewithin for enabling the valve elements thereof to shift to and from a state of cut-in from and to cut-out with precision in timing when required.

It is another object of this invention to provide an improved hydraulic pressure control valve of the above-mentioned character which can shift to and from a state of cut-in from and to cut-out quickly when so required.

It is a further object of this invention to provide an improved hydraulic pressure control valve of the above-mentioned character whereby it is possible to readily selectively change predetermined pressures obtainable thereof by simply replacing resilient means incorporated therein with another one of different coefficient of compression.

It is a still further object of this invention to provide an improved hydraulic pressure control valve of such construction wherein valve body means are separable from valve housing means, so that ports and passageways for the operating liquid may be machined with ease and precision.

The foregoing objects, characteristics, principle, and details of the present invention, as well as further objects and advantages thereof, will become more apparent from the following detailed description with respect to preferred embodiments of the invention when read in conjunction with the accompanying drawings, in which like parts of the hydraulic pressure control valve are designated with like reference numerals.

In the accompanying drawings:

FIG. 1 is a plan view, in transverse cross section, of a first embodiment of a hydraulic pressure control valve according to this invention;

FIG. 2 is a longitudinal section view of a part of the control valve taken along the plane designated by line 2—2 in FIG. 1;

Figure 3A:
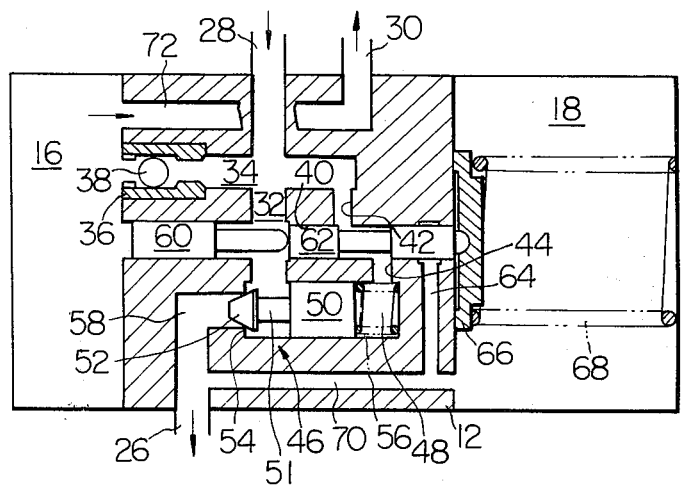
FIGS. 3a through 3c are diagrams of the operating positions of the first embodiment of the valve of this invention.

Referring now to FIGS. 1 and 2, there is shown a hydraulic pressure control valve of this invention, which comprises a valve housing 10 and a valve body 12, the latter being inserted in a bore of the valve housing 10 and secured rigidly in position therein by way of a removable cap 14, so that there are defined an accumulator chamber 16 and a spring chamber 18 laterally in opposed ends within the valve housing 10 as viewed in FIG. 1.

Three axially spaced annular grooves 20, 22 and 24 are formed on the circumferential surface of the valve body 12. The annular grooves 20, 22 and 24 may be aligned with a drain 26, an inlet port 28 and an outlet port 30, respectively. The valve body 12 is provided with a passageway 32 radially extending for communicating two diametrically opposed locations of the annular groove 22 and a passageway 34 axially initiating from a point in the right lower position for the valve body as viewed in FIG. 1 and passing at right angles through the radial passageway 32 and extending to the accumulator chamber 16 in the left end portion of the valve housing 10 as viewed in FIG. 1. A check valve 36 with a ball 38 is provided at the left end of the axial passageway 34 adjacent the accumulator chamber 16 to check reverse flow of the operating liquid from the accumulator chamber 16 back to the axial passageway 34, when the liquid pressure in the accumulator chamber is higher than that in the radial passageway 32. The other end of the axial passageway 34 opens to a passageway 42 which communicates with a through passageway 40 open to both sides of the valve body 12. Through this passageway 42, another passageway 44 likewise communicates with the through passageway 40 and is offset axially away from but parallel with the passageway 42, and further communicates with a chamber 48 defined behind a main valve 46.

The main valve 46 has a spool 51 with a land 50 and a poppet 52 slidably fitted in a bore provided in the valve body 12 with a valve seat 54 for the poppet 52. A spring 56 urges the main valve 46 to close. The valve seat 54 is disposed in a passageway 58 axially extending between the radial passageway 32 and the annular groove 20 to communicate the two.

A control piston 60 and a pilot spool 62 in immediate contact with each other in axial relationship from the side of the accumulator chamber 16 are disposed in the through passageway 40. The pilot spool 62 is provided with lands of the same diameter at both ends thereof. The lands of the pilot spool 62 control the liquid paths among passageways 42, 44 and a port 64, according to the positions that the pilot spool 62 takes by sliding in the axial direction within the passageway 40. The control piston 60 is designed with a larger diameter than that of the lands of the pilot spool 62. A large diameter section of the control piston 60 is exposed to a hydraulic pressure of the accumulator chamber, and this accumulator pressure is in turn relayed to one end of the pilot spool 62 through the control piston 60 adjacent the pilot spool while the other end of the pilot spool 62 is biased by a control spring 68 mounted on spring seat 66 in the opposite direction. The port 64 communicates with the annular groove 20 through a channel 70 provided in the valve body 12, and further with the drain 26 through this annular groove 20. A passageway 72 is provided to intercommunicate the annular groove 24 with the accumulator chamber 16, through which passageway the accumulated liquid within the accumulator 16 is fed to the outlet port 30.

Figure 3B:
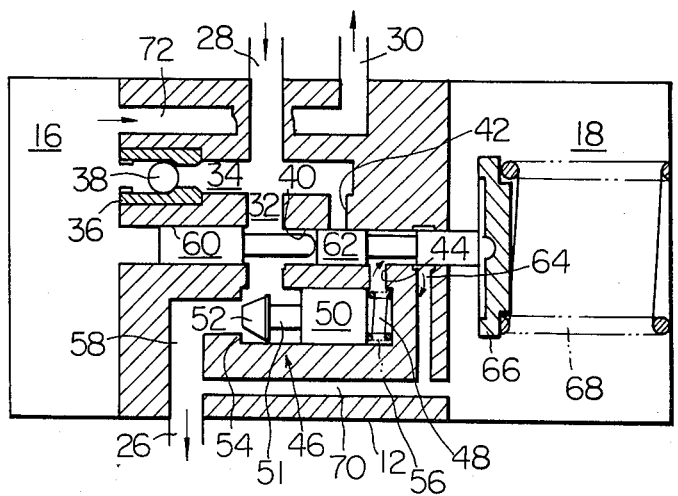
Figure 3C:
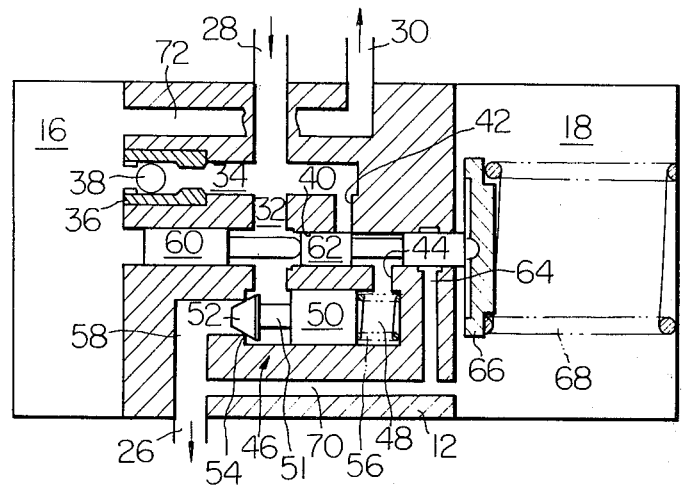

Referring to FIGS. 3a through 3c, which illustrate various operating positions of the hydraulic pressure control valve according to this invention, the general operation of the valve will be described.

FIG. 3a shows the cut-in state of the hydraulic pressure control valve, wherein the pilot spool 62 is now in a position to communicate the passageways 42 and 44, while closing the port 64, and therefore, the hydraulic pressure from the pump through the port 28 is now working on both sides of the spool land 50 of the main valve 46. On the other hand, due to the differential pressures working on the area differentials of the spool 50 and the opening of the valve seat 54, as well as the biasing force of the spring 56, the main valve 46 is caused to have its poppet 52 urged against the valve seat 54 to close the passageways 32 and 58. Consequently, the hydraulic fluid under pressure from the pump through the port 28 flows straight to the accumulator 16 through the check valve 36. Thus the hydraulic pressure within the accumulator chamber is increased.

As the accumulator pressure increases, this increased pressure is applied on the pilot spool 62 through the control piston 60. Therefore, the pilot spool 62 is caused to slide against the biasing force of the control spring 68 toward a position where the force of the accumulator pressure reaches an equilibrium with the spring force.

When the accumulator pressure reaches the level at which the hydraulic pressure control valve is in the cut-out state (hereinafter, this pressure is referred to as "cut-out pressure"), this pressure now urges the control piston 60 toward the right as viewed in FIG. 3b so that the pilot spool 62 may be pushed in turn by the control piston the same direction thereof, closing the passageway 42 and opening slightly the port 64, and thus communicating the port 64 with the passageway 44. By this movement of the control piston 60 or of the pilot spool 62, the chamber 48 including the spring 56 therein is now caused to communicate with the drain 26 through the passageway 44, the port 64 and the channel 70, thus reducing the pressure within the chamber 48. On the other hand, the left end of the spool 50 of the main valve 46 adjacent the poppet 52 as viewed in FIG. 3b, is still under hydraulic pressure from the pump (which is equal with the above-mentioned cut-out pressure), and this hydraulic pressure overcomes the biasing force of the spring 56 so as to cause the entire main valve 46 to slide with its poppet 52 slightly unseated from seat 54, thus causing the port 28 to communicate with the drain 26 through the radial passageway 32. With this movement of the main valve 46, the pressurized liquid from the hydraulic pump to the port 28 flows straight to the drain 26 passing through the main valve 46. Thus, the pressure within the radial passageway 32 is reduced below the cut-out pressure.

As such difference between these pressures is so small that the ball 38 of the check valve 36 does not tightly seat on the valve seat thereof, it only approaches the proximity thereof. The pressure in the accumulator chamber is thus maintained at the cut-out pressure level.

Concurrently, the pressure drop in the radial passageway 32 described above will, in cooperation with the control spring 68, result in a sharp reduction of force exerted upon the control piston 60, whereby the pilot spool 62 is caused to instantaneously move in the direction to cause the port 64 to open further. With the instantaneous move of the pilot spool 62 thus produced, the pressure in the chamber 48 is reduced sharply to atmospheric pressure, thus the main valve 46 is quickly fully opened, and consequently, the ball 38 of the check valve 36 is instantaneously seated in the rightmost position as viewed in FIG. 3b following the pressure drop in the radial passageway 32. Thus the accumulator chamber 16 is maintained at the cut-out pressure level.

When the pressure within the accumulator chamber 16 is exhausted, the force of the control piston 60 urging the pilot spool 62 will decrease to an extent that corresponds to the pressure exhaustion, so that the pilot spool 62 may be moved to the left by the control spring 68, accordingly.

As the accumulator pressure is reduced and reaches the level at which the hydraulic pressure control valve is in the cut-in state (hereinafter, this pressure is referred to as "cut-in pressure"), the pilot spool 62 slides back to a position shown in FIG. 3c to close the port 64, while beginning to open the passageway 42, thus resulting in a communication between this passageway 42 and the passageway 44. With such communication therebetween, a pressure equivalent to the pump pressure is built within the chamber 48, and the main valve 46 is now exposed to the above-mentioned pump pressure at both ends of the spool 50 thereof, which causes no movement of the main valve per se. At this moment, the main valve 46 moves toward the left as viewed in FIG. 3c by the biasing force of the spring 56, with the poppet 52 nearly seating on the valve seat 54. By the above described function of the main valve 46, the pressure in the radial passageway 32 increases, which in turn causes the pilot spool 62 to instantaneously move by the biasing force of the control spring 68 toward the position where the passageway 42 is fully opened to the passageway 44. At this moment, the right end surface of the spool 50 of the main valve 46 is exposed to the pump pressure as it is introduced into the chamber 48, thus instantaneously causing the poppet 52 to seat on the valve seat 54, as shown in FIG. 3c.

Consequently, the pressure within the radial passageway 32 increases to the cut-in pressure of the hydraulic pressure control valve. As the pressure within the accumulator chamber 16 is exhausted, the extent of such pressure exhaustion in the accumulator chamber 16 is continuously compensated by the hydraulic pump through the port 28, the radial and axial passageways 32 and 34, and the check valve 36.

Figure 4:
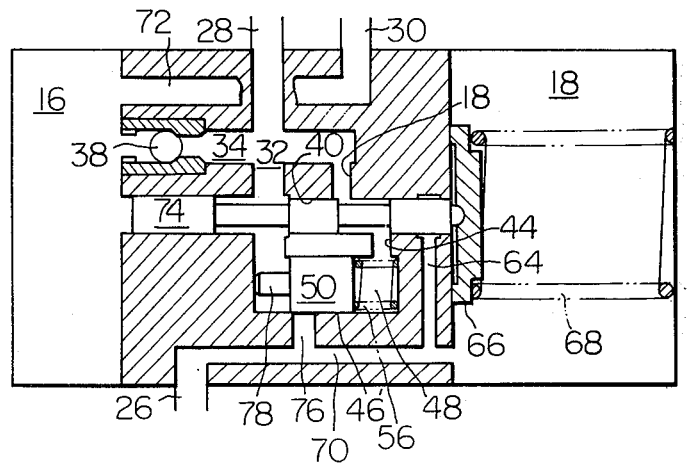
FIG. 4 is similar to FIG. 3 indicating one operating position of the valve according to a second embodiment of this invention.

Referring now to FIG. 4 the general arrangement of a second embodiment of the hydraulic pressure control valve of this invention is shown. In this embodiment, unlike the separately constructed control piston 60 and pilot spool 62 as in the first embodiment shown in FIGS. 3a through 3c, an integrally constructed valve element generally designated by the reference numeral 74 is slidably fitted into the through passageway 40 in the valve body 12, and the main valve 46' has the large diameter spool land 50 and a small diameter land 78 extending from the spool land 50 without any poppet as shown in the embodiment of FIGS. 1 to 3. The main valve 46' of such configuration is located in such fashion that it may function to open and close with its spool land 50 communications as land 50 in the first embodiment and may give a stopping position with the small diameter land 78 similarly to poppet 52. The configuration of the main valve 46' is provided with such port arrangement that an additional radial passageway 76 communicates with the drain 26, and is arranged to open and close by the spool land 50 of the main valve, i.e., when the extension 78 stops against the inner wall of the valve body 12, the spool land 50 closes the port to the radial passageway 76 so that there is no liquid flow through the main valve from the radial passageway 32 to the drain pipe 26, and when the spool of the main valve 46' moves toward the right as viewed in FIG. 4 against the biasing force of the spring 56, the radial passageway 76 is opened and the liquid under pump pressure is admitted straight through to the drain 26.

As shown in FIG. 4, the configuration and location of the valve element 74, although integrated in construction, are the same as the combination of the control piston 60 and the pilot spool 62, and all port arrangements and connections other than the portions described above are identical with the case of the first embodiment of this invention described hereinbefore. The operation of the hydraulic pressure control valve of the first embodiment is truly the same for this embodiment as well.

As will become apparent from the foregoing detailed descriptions, there is provided an improved hydraulic pressure control valve having such advantageous features as well as useful effects as summarized in the following, i.e., this hydraulic pressure control valve is capable of shifting to and from a state of cut-in from and to cut-out with precision in timing as well as quickly, thereby providing an accumulator pressure control absolutely accurate in operation, and furthermore, this control valve can be machined easily in the manufacture of its ports and passageways by the provision of a separable valve housing and valve body, and also, the actuating pressure points of this control valve are readily changeable for cut-in and cut-out states by simply replacing the control spring thereof with one having having a different design compressibility. Such hydraulic pressure control valve can, as is apparent from the accompanying drawings, be designed and constructed with substantial economy in the manufacture and maintenance, yet providing unique performance in operation as described hereinbefore.

What is claimed is:
1. A hydraulic pressure control valve comprising:
an inlet communicating with a source of pumping pressure;
a drain communicable with said inlet;
an accumulator chamber communicable with said inlet through a check valve which is responsive to pressure difference between accumulator pressure and said pumping pressure;
a main valve spool disposed in said drain for selectively opening and closing said drain, said main valve spool having one end continuously exposed to said pumping pressure and another end continuously urged in a direction to close said drain by urging means, and the another end of said main valve spool being selectively exposed to said pumping pressure; and
a pilot valve spool disposed between said inlet and said drain at a position upstream of said main valve spool and responsive to said accumulator pressure;
whereby when said accumulator pressure is below a predetermined value, said pilot valve spool is moved to a position to cause said pumping pressure to act on said another end of said main valve spool by which said main valve spool is moved to a position to close said drain by the force of said urging means and the force developed by said pumping pressure acting on said another end of said main valve spool so that said pumping pressure is admitted to said accumulator chamber through said check valve, whereas when said accumulator pressure is above the predetermined value, said pilot valve spool is moved to another position to prevent said pumping pressure acting on said another end of said main valve spool so that said main valve spool is moved to another position to open said drain.

2. A hydraulic pressure control valve comprising:
an inlet communicating with a source of pumping pressure;
a drain communicable with said inlet;
an accumulator chamber communicable with said inlet through a check valve at a position upstream of said drain, said check valve being responsive to pressure difference between accumulator pressure and said pumping pressure;
a main valve spool operatively disposed in said drain for selectively opening and closing said drain, said main valve spool having one end continuously exposed to said pumping pressure and another end selectively exposed to said pumping pressure;
first urging means urging said another end of said main valve spool in a direction to close said drain;
a pilot valve spool disposed between said inlet and said drain at a position upstream of said main valve spool and responsive to said accumulator pressure for selectively causing said pumping pressure to act on said another end of said main valve spool; and
second urging means for urging said pilot valve spool in a direction to cause said pumping pressure act on said another end of said main valve spool;
said pilot valve spool being responsive to said accumulator pressure in said accumulator chamber, whereby when said accumulator pressure is below a predetermined value, said pilot valve spool is moved by the action of said second urging means to a position to cause said pumping pressure to act on said another end of said main valve spool by which said main valve spool is moved to a position to close said drain, whereas when said accumulator pressure is above said predetermined value, said pilot valve is moved against the action of said second urging means to another position to prevent said pumping pressure from acting on said another end of said main valve spool by which said main valve spool is moved by the force developed by the pumping pressure acting on said one end of said main valve spool to another position to open said drain.

3. A hydraulic pressure control valve according to claim 2, further comprising a control valve spool axially aligned with said pilot valve spool and coacting therewith.

4. A hydraulic pressure control valve according to claim 3, in which said control valve spool has one end exposed to said accumulator pressure in said accumulator chamber and another end connected to one end of said pilot valve spool.

5. A hydraulic pressure control valve according to claim 4, in which said control valve spool and said pilot valve spool are separately formed.

6. A hydraulic pressure control valve according to claim 4, in which said control valve spool and said pilot valve spool are integrally formed with each other.

7. A hydraulic pressure control valve comprising:
an inlet communicating with a source of pumping pressure;
a drain communicable with said inlet;
an accumulator chamber communicable with said inlet through a check valve at a position upstream of said drain, said check valve being responsive to pressure difference between accumulator pressure in said accumulator chamber and said pumping pressure;
a first valve chamber communicating with said inlet through first passage means and having an opening selectively communicable with said inlet through second passage means;
a main valve spool slidably disposed in said first valve chamber for selectively opening and closing said drain, said main valve spool having one end continuously exposed to said pumping pressure admitted through said first passage means and another end selectively exposed to said pumping pressure admitted through said second passage means and said opening;
first urging means disposed in said first valve chamber for urging said main valve spool in a direction to close said drain;
a second valve chamber formed at a position upstream of said first valve chamber intersecting said first and second passage means;
a pilot valve spool slidably disposed in said second valve chamber for selectively opening and closing said second passage means; and
second urging means for urging said pilot valve spool in a direction to open said second passage means;
said pilot valve spool being responsive to said accumulator pressure in said accumulator chamber, whereby when said accumulator pressure is below a predetermined value, said pilot valve spool is moved by the action of said second urging means to a position to open said second passage means by which said pumping pressure is admitted therethrough into said opening of said first valve chamber so that the pumping pressure acts on said another end of said main valve spool to move the same to a position to close said drain, whereas when said accumulator pressure is above said predetermined value, said pilot valve is moved against the force of said second urging means to a position to close said second passage means to prevent said pumping pressure from being admitted to said opening so that the main valve spool is moved against the force of said first urging means by the force developed by said pumping pressure acting on said one end of said main valve spool.

8. A hydraulic pressure control valve comprising:
and inlet communicating with a source of pumping pressure;
a drain communicable with said inlet;
an accumulator chamber communicable with said inlet through a check valve at a position upstream of said drain, said check valve being responsive to pressure difference between accumulator pressure in said accumulator chamber and said pumping pressure;
a first valve chamber communicating with said inlet through first passage means and having an opening selectively communicable with said inlet through second passage means;
a main valve spool slidably disposed in said first valve chamber for selectively opening and closing said drain, said main valve spool having one end continuously exposed to said pumping pressure admitted through said first passage means and another end selectively exposed to said pumping pressure admitted through said second passage means and said opening;
first urging means disposed in said first valve chamber for urging said main valve spool in a direction to close said drain;
a second valve chamber formed at a position upstream of said first valve chamber and intersecting said first and second passage means;
a pilot valve spool slidably disposed in said second valve chamber for selectively opening and closing said second passage means;
a control valve spool slidably disposed in said second valve chamber and coacting with said pilot valve spool, said control valve spool being exposed at its one end to said accumulator chamber; and
second urging means for urging said pilot valve spool in a direction to open said second passage means;
said control valve spool being responsive to said accumulator pressure in said accumulator chamber, whereby when said accumulator pressure is below a predetermined value, said control valve spool and said pilot valve spool are moved against the force developed by said accumulator pressure acting on said control valve spool by the action of said second urging means to a position to open said second passage means by which said pumping pressure is admitted therethrough into said opening of said first valve chamber so that the pumping pressure acts on said another end of said main valve spool to move the same to a position to close said drain, whereas when said accumulator pressure is above said predetermined value, said control valve spool and said pilot valve spool are moved by the force developed against the force of said second urging means to a position to close said second passage means to prevent said pumping pressure from being admitted to said opening so that the main valve spool is moved against the force of said first urging means by the force developed by said pumping pressure acting on said one end of said main valve spool.

9. A hydraulic pressure control valve according to claim 8, in which said control valve spool and said pilot valve spool are separately formed from each other.

10. A hydraulic pressure control valve according to claim 9, in which said main valve spool has a valve seat formed at its one end and a valve land formed at its another end.

11. A hydraulic pressure control valve according to claim 8, in which said control valve spool and said pilot valve spool are integrally formed with each other.

12. A hydraulic pressure control valve according to claim 11, in which said main valve spool has a valve land adapted to open and close said drain.

13. A hydraulic pressure control valve comprising:
an inlet communicating with a source of pumping pressure;
a drain communicable with said inlet;
an accumulator chamber communicable with said inlet through a check valve at a position upstream of said drain, said check valve being responsive to pressure difference between accumulator pressure in said accumulator chamber and said pumping pressure;
first passage means communicating with said inlet;
second passage means communicating with said inlet;
third passage means communicating with said drain;
a first valve chamber communicating with said first passage means and having an opening communicable with said second and third passage means;
a main valve spool slidably disposed in said first valve chamber for selectively opening and closing said drain, said main valve spool having one end continuously exposed to said pumping pressure admitted to said first valve chamber through said first passage means and another end selectively exposed to said pumping pressure admitted to said opening through said second passage means;
first urging means disposed in said first valve chamber for urging said main valve spool in a direction to close said drain;
a second valve chamber formed at a position upstream of said first valve chamber and intersecting said first and second passage means;
a pilot valve spool slidably disposed in said second valve chamber for selectively opening and closing said second passage means while at the same time selectively closing and opening said third means;
a control valve spool slidably disposed in said second valve chamber and coacting with said pilot valve spool, said control valve spool being exposed at its one end to said accumulator pressure in said accumulator chamber; and
second urging means for urging said pilot valve spool in a direction to open said second passage means and close said third passage means;
said control valve spool being responsive to said accumulator pressure in said accumulator chamber, whereby when said accumulator pressure is below a predetermined valve, said control valve spool and said pilot valve spool are moved against the force developed by the accumulator pressure acting on said one end of said control valve spool by the force of said second urging means to a position to open said second passage means and at the same time close said third passage means by which said pumping pressure is admitted to said opening through said second passage means and acts on said another end of said main valve spool to move the same to close said drain, whereas when said accumulator pressure is above said predetermined value, said control valve spool and said pilot valve spool are moved against the force of said second urging means by the force developed by the accumulator pressure acting on said one end of said control valve spool to a position to close said second passage means and at the same time open said third passage means by which the pumping pressure in said opening is drained through said third passage means and said drain and accordingly said main valve spool is moved against the force of said first urging means by the force developed by said pumping pressure acting on said one end of said main valve spool to a position to open said drain.

* * * * *